UNITED STATES PATENT OFFICE.

FREDERICK G. KEYES, OF BOSTON, MASSACHUSETTS.

REFRIGERATING COMPOSITION.

1,267,772. Specification of Letters Patent. Patented May 28, 1918.

No Drawing. Application filed August 17, 1917. Serial No. 186,691.

*To all whom it may concern:*

Be it known that I, FREDERICK G. KEYES, a citizen of the United States, residing at Boston, in the county of Suffolk and State of Massachusetts, have invented certain new and useful Improvements in Refrigerating Compositions, of which the following is a full, clear, and exact description.

In an application filed by me on May 27, 1916, Serial No. 100,379, I have disclosed a new composition for use in refrigerating apparatus distinguished by the presence in it of a volatile refrigerant, an active absorbent for the same and a solvent such as water. It is proposed in the said application, by the use of suitable apparatus, to distil off the refrigerant from the composition to condense it and then return it in gaseous form to the distilling chamber by the affinity therefor exerted by the absorbent.

This composition and the apparatus which is employed for its use, have proved to be of the highest practical value, but I have sought to increase the rate of absorption of the ammonia vapor without diminution of the capacity per unit weight of the absorbent, and in so doing I have made a discovery of an entirely new principle in the art and one of the very greatest value.

In other words, I have found that the proportionate amount of solvent water may be very much increased, with a greatly increased absorptive power of the composition, by using a material which will materially reduce the vapor pressure of the water, so that in the distilling step in the process no appreciable amount will be carried over with the ammonia to the condenser.

There are a number of substances in the form of salts or fluids which have this property of reducing the vapor pressure of water, but few of them are available for my purpose; for example, calcium chlorid, which, however, forms a compound with ammonia, sodium sulfate and the like, or sulfuric acid, none of which could be employed to any advantage in my process for obvious reasons. I have found, however, that glycerin, which has this effect upon water, is admirably adapted for the purpose besides being itself capable of absorbing ammonia, and this may, perhaps, be the only material which is practically available for the purpose.

In carrying out my discovery, therefore, I use a compound of nitrate of ammonia as the main absorbent, glycerin and water. No new or unknown steps need be followed in making up this composition. For example, I take, say, six pounds of dry ammonium nitrate, two and a half pounds of anhydrous glycerin and one and a half pounds of water and mix them thoroughly, and this mixture I then combine with a sufficient proportion of ammonia to meet the requirements of practical operation.

If ammonia in the form of vapor be led into the mixture it is so readily and rapidly absorbed that no gas bubbles reach the surface, and this condition continues until about 40% of the weight of the mixture is absorbed at a pressure of one atmosphere.

The rapidity with which the vapor is absorbed by the solution does not appear to be appreciably affected by an increase of temperature, although the amount ultimately dissolved will, in general, be less as the temperature rises.

In the practical use of the new composition the proportions given above are preferably used, although these may be varied, that is to say, 60% nitrate, 25% glycerin and 15% water, and as much ammonia as will result in the distilling off of all that is necessary for practical use at a temperature not to exceed 100° C.

The apparatus employed is or may be of the kind now known for use with such materials; that is to say, by the application of heat the ammonia is driven over from a distilling chamber into a condenser, and from the latter delivered into a refrigerating chamber, and when the latter is filled to the desired extent it is connected up with the distilling chamber, which is then cooled and the condenser then shut off.

The proportions above given are not to be rigidly adhered to, but are believed to be the best for all practical results. For example, if less water be used the nitrate is apt to solidify in crystals on the cooling of the mixture after it is made.

As an absorbent I may use other substances, such as ammonium sulfo-cyanate, but the nitrate for practical reasons is the most desirable.

Having now described my invention, what I claim is:

1. A refrigerating composition comprising a volatile refrigerant, an active absorbent therefor, water as a solvent, and a substance that materially reduces the vapor pressure of the water without interfering with the use of the material in the process of refrigeration.

2. A refrigerating composition, comprising a volatile refrigerant, an active absorbent therefor, water as a solvent and glycerin.

3. A refrigerating composition, comprising ammonia, ammonium nitrate, water and glycerin in substantially the proportions stated.

4. A refrigerating composition, comprising, with a sufficient amount of ammonia, sixty per cent. of ammonium nitrate, twenty-five per cent. of glycerin, and fifteen per cent. of water.

5. A refrigerating composition containing a volatile refrigerant, water and a substance which will have the effect of reducing the vapor pressure of the water.

In testimony whereof I hereunto affix my signature.

FREDERICK G. KEYES.